United States Patent [19]

Takano et al.

[11] Patent Number: 4,618,537
[45] Date of Patent: Oct. 21, 1986

[54] RECORDING MEDIUM

[75] Inventors: Katsuhiko Takano, Yokohama; Shigeharu Iijima; Satoshi Yoshihara, both of Kawasaki; Masaaki Matsushima, Machida; Hiroyoshi Kishi, Tokyo; Eizo Sasamori, Yokohama, all of Japan

[73] Assignee: Canon Kabushiki Kaisha, Tokyo, Japan

[21] Appl. No.: 573,478

[22] Filed: Jan. 24, 1984

[30] Foreign Application Priority Data

Jan. 31, 1983 [JP] Japan .................... 58-12940

[51] Int. Cl.⁴ .............................. G11B 5/72
[52] U.S. Cl. ...................... 428/336; 360/134; 360/135; 360/136; 427/128; 427/131; 427/132; 428/694; 428/695; 428/900; 428/411.1

[58] Field of Search ......... 428/694, 900, 695, 336, 428/426, 411.1; 427/131, 132, 128; 360/134–136

[56] References Cited

U.S. PATENT DOCUMENTS

| | | | |
|---|---|---|---|
| 3,993,824 | 11/1976 | Shirahata | 428/900 |
| 4,293,621 | 10/1981 | Togami | 428/694 |
| 4,307,156 | 12/1981 | Yanagisawa | 428/694 |
| 4,315,057 | 2/1982 | Horigome | 428/694 |
| 4,411,963 | 10/1983 | Aine | 428/694 |
| 4,419,404 | 12/1983 | Arai | 428/695 |
| 4,425,404 | 1/1984 | Suzuki | 428/695 |

Primary Examiner—Ellis P. Robinson
Attorney, Agent, or Firm—Fitzpatrick, Cella, Harper & Scinto

[57] ABSTRACT

A recording medium comprising a substrate, a recording layer formed thereupon, and an anticorrosive layer which covers the recording layer and contains a chemical to prevent the corrosion of the recording layer.

21 Claims, 2 Drawing Figures

RECORDING MEDIUM

BACKGROUND OF THE INVENTION

1. Field of the Invention

This invention relates to a recording medium for use in magnetooptic memory devices, magnetic recording systems, display elements, etc.

2. Description of the Prior Art

With the recent expansion of information-oriented society, there is demand for a memory device or recording system which has a simple structure and a large capacity of information recording. At the same time, extensive research and development are made for recording media capable of high density and large volume recording.

An example of such recording media is the magnetooptic recording medium. It comprises a thin recording layer such as a polycrystalline film of, e.g. MnBi or MnCuBi, an amorphous film of, e.g. GdCo, GdFe, TbFe, DyFe, GdTbFe or TbDyFe, a single-crystal film of, e.g. GIG (gadolinium-iron-garnet). Information recorded as the inversion of magnetization with light and heat energy or the like in the recording medium is read by utilizing a magnetooptical effect such as magnetic Kerr effect or Faraday effect.

Among the above thin films constructing recording layers, the amorphous film is lately considered to be superior as a magnetooptical recording medium in view of the film-forming property of the material for making a thin, large film at around room temperature, the light and heat energy efficiency for writing signals therein, and the S/N ratio in reading the written signals. In particular GdTbFe is best suited for magnetooptical recording media because of its large Kerr rotational angle and approximate Curie temperature of 150° C.

However, amorphous magnetic materials including GdTbFe as a typical example have generally a drawback of low corrosion resistance; that is, these materials, on exposure to the atmosphere or water vapor, undergo deterioration of magnetic characteristics, and eventually, are oxidized completely and turns transparent.

Corrosion is a very critical problem not only for the recording media made of the above amorphous magnetic materials but also for those made of other magnetic or non-magnetic materials. The corrosion of recording materials will make the writing of information impossible and at the worst it would erase even the important recorded information.

There have so far been known recording media comprising a recording layer coated with a protective layer of, for example, $SiO_2$ or SiO and those comprising a pair of recording layers which are supported each on a substrate and bonded to be in contact with each other. However, both types of recording media are not so effective for preventing the corrosion of the recording layer, though effective for protecting from such damages as scratches. For the purpose of preventing the recording layer from oxidation, another type of recording medium has been proposed. This comprises a pair of recording layers which are supported each on a substrate, bonded together through a spacer with the recording layers facing each other, and contains an inert gas sealed in the inner space. However, this type of recording medium is disadvantageous in that the production thereof requires many steps resulting in high cost and the hollow structure thereof makes the medium fragile to a shock when the substrates are made of glass.

SUMMARY OF THE INVENTION

An object of this invention is to provide a recording medium effectively prevented from the corrosion of the recording layer thereof.

Another object of this invention is to provide a recording medium which is effectively prevented from the corrosion of the recording layer and additionally can be produced at a low cost.

According to one aspect of the present invention, there is provided a recording medium comprising a substrate, a recording layer formed thereupon, and an anticorrosive layer which covers the recording layer and contains a chemical agent to prevent the corrosion of the recording layer.

DETAILED DESCRIPTION OF EMBODIMENTS OF THE INVENTION

Figure 1:
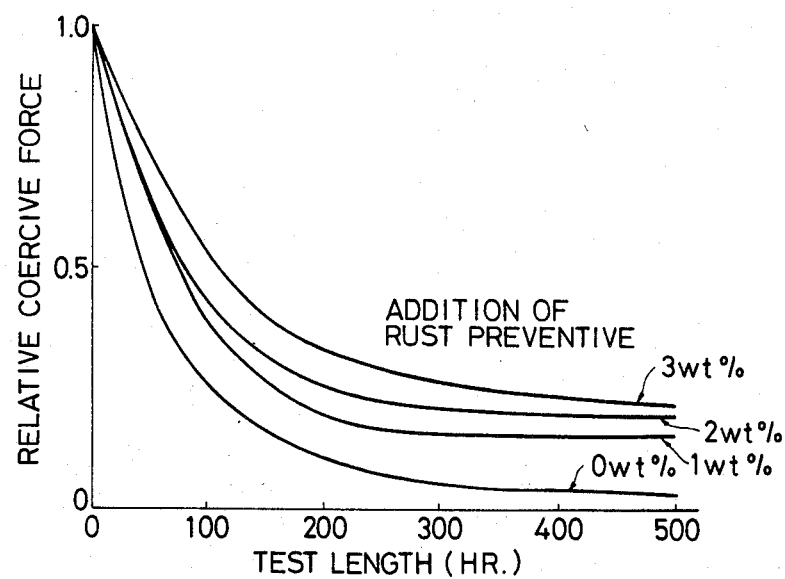
FIG. 1 illustrates the results of corrosion resistance tests of recording media prepared in Example 1 of this invention and of a recording medium which does not have the anticorrosive layer of this invention.

The recording medium of this invention is characterized by having an anticorrosive layer which covers the recording layer formed on a substrate and contains a chemical agent capable of preventing the corrosion of the recording layer.

Chemical agents capable of preventing the corrosion of the recording layer need to be inert to the recording layer and have no adverse effect on the recording performance. Such chemical agents include, for example, the following commercial rust preventives:

Volatile rust preventives, e.g. Diana (Ryoko Kagaku Co., Ltd.), Cortop (Nippon Kakoshi Co., Ltd.) V.P.M. (Nippon Kagakusangyo Co., Ltd.), Ferro Guard (Ronco Laboratories Co., U.S.A.), Zerust (Taiyo Ekikagasu Co.), and Kiles Guard (Nippon Kagakusangyo Co., Ltd.); Oil-soluble rust preventives, e.g. Metal Guard (Mobil Petroleum Co.), Ruston (Tobi Kagaku Co., Ltd.), C.R.C. (Ryoko Kagaku Co., Ltd), and Dialate (Ryoko Kagaku Co., Ltd.).

The principal constituents of the above-mentioned commercial rust preventives as available from their respective manufacturers are shown in the following table:

| Trade name | Principal constituent |
| --- | --- |
| Zerust (Taiyo Ekikagasu Co.) | Mixture mainly constituted of amines (octadecylamine) |
| Diana (Ryoko Kagaku Co., Ltd.) | Dicyclohexylammonium nitrite |
| Cortop (Nippon Kakoshi Co., Ltd.) | " |
| Kiles Guard (Nippon Kagakusangyo Co., Ltd.) | " |
| Ferroguard (Ronco Laboratories Co., U.S.A.) | Reaction product of dicyclohexylamine with octanoic acid |
| Ruston U (Ronco Laboratories Co., U.S.A.) | Special calcium salt (calcium stearate) |
| CRC-2-26 (Ryoko Kagaku Co., Ltd.) | Surfactant of fatty acid ester type (stearate and oleate) and ether type |

| Trade name | Principal constituent |
|---|---|
| Dialate #500 (Ryoko Kagaku Co., Ltd.) | Fatty acid amine (stearic acid amine) |
| CRC-3-36 (Ryoko Kagaku Co., Ltd.) | Surfactant of fatty acid ester type (stearate and oleate) and ether type |
| V.P.M. (Nippon Kagakusangyo Co., Ltd.) | Dicyclohexylammonium nitrite |

The anticorrosive layer of this invention is a layer 30–200 μm thick formed on the recording layer from, for instance, an adhesive containing the above rust preventive. The anticorrosive layer thinner than 30 μm is difficult to form, and the one thicker than 200 μm, for instance, protrudes from the edge of the recording medium, both being undesirable. The formation of the anticorrosive layer is possible by any method such as usual coating or spraying. A protective plate of glass or the like, when glued onto the anticorrosive layer, further improves the corrosion resistance of the recording layer.

Generally, the amount of the rust preventive to be added to the adhesive is desirably 10% or less, preferably 2.0–5.0%, by weight based on the weight of the anticorrosive layer. The rust preventive less than 2.0% by weight does not exhibit sufficient anti-corrosive effect and exceeding 5.0% by weight does not give enough bond strength between the anticorrosive layer and the recording layer.

Adhesives for use in the anticorrosive layer include, for example, KE66RTV (Shinetsu Chem. Ind. Co., Ltd.) Loctite 350 (Nippon Loctite Co., Ltd.), Threebond 3021 (Threebond Co., Ltd.), and Photobond 300 (Meisei Churchill Co., Ltd.).

The anticorrosive layer may contain some other organic materials such as a coating material and sealent besides the adhesive and rust preventive.

Another embodiment of the recording medium of this invention has a protective layer consisting of a metal such as Ti, Cr, Zn, Al or Si on the recording layer and being covered with a similar anticorrosive layer containing such a rust preventive as mentioned above. In this case, the recording medium obtained has much superior corrosion resistance, since the recording layer is shielded with the protective layer from air, and defects such as pinholes of the protective layer are filled with the anticorrosive layer, and further the corrosion of the protective layer and recording layer is prevented with the anticorrosive layer. In lieu of the above metal, an oxide such as SiO, $SiO_2$ or $Al_2O_3$ may be used for the protective layer.

A further embodiment of the recording medium of this invention has a structure comprising two recording layers, said layers being supported on a substrate respectively, and bonded together through an anticorrosive layer containing such a rust preventive as mentioned above, with recording layers facing together. In the case of this type of recording medium, the information recording on the recording layers and its reproduction can be carried out from both sides of the recording medium through the substrates.

EXAMPLE 1

Films of GdTbFeCo were formed each as a recording layer on a glass substrate by using a high-frequency sputtering apparatus. Then, recording media were prepared by gluing a protective glass plate over the recording layer supported by a glass substrate, respectively, with mixtures of an acrylic adhesive (trade name: URC153, supplied by Sanyo Trading Co., Ltd.) containing 1%, 2% and 3% by weight of a volatile rust preventive (dicyclohexylammonium nitrite).

The three kinds of recording media thus obtained were tested for corrosion resistance in a thermo-hygrostat at 85° C. and 85% R.H. For comparison, a recording medium prepared in the same manner but using the above adhesive containing no rust preventive was tested similarly. Results of these tests are shown in FIG. 1, wherein the ordinate indicates the ratio of the coercive force after a given exposure time to the initial value and the abscissa indicates the exposure time. The larger drop in the coercive force indicates the more corrosion proceeding.

FIG. 1 clearly shows that the corrosion resistance of the recording media was more improved with a large amount of the rust preventive added.

EXAMPLE 2

Figure 2:
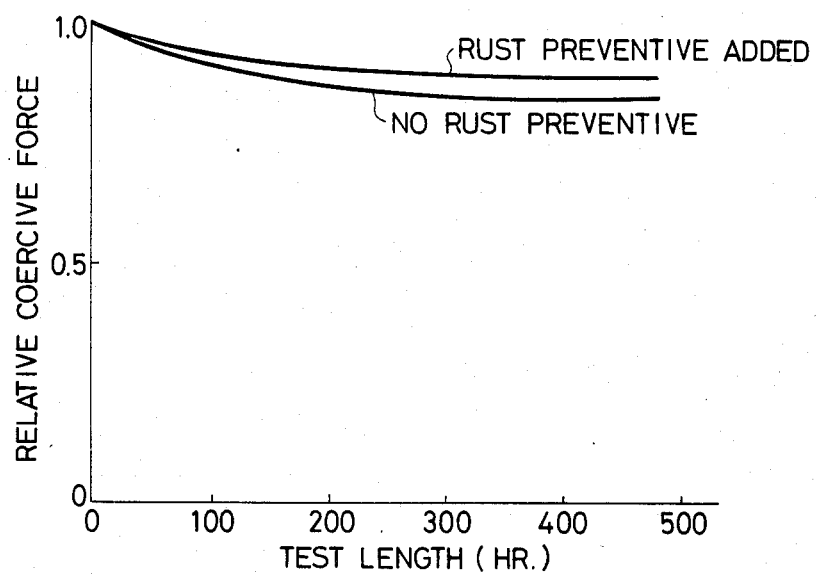
FIG. 2 illustrates the results of the same tests of the recording medium prepared in Example 2 of this invention and of a recording medium which does not have the anticorrosive layer of this invention.

A film of GdTbFeCo was formed as a recording layer on a glass substrate in the same way as in Example 1. A titanium film 4000 Å thick was vapor-deposited as a protective layer on the recording layer by electron beam using a vacuum-deposition apparatus. A protective glass plate was glued over the titanium film with the same adhesive containing a rust preventive (rust preventive content 3 wt%) as the one used in Example 1. The thus obtained recording medium was tested for corrosion resistance in the thermo-hygrostate at 85° C. and 85% R.H. For comparison, a recording medium prepared without using any rust preventive was also tested. The results of the tests are shown in FIG. 2, wherein the coordinate has the same meaning as in FIG. 1. As is obvious from FIG. 2, the recording medium prepared by using the rust preventive is superior in corrosion resistance.

Using separately GdTbFe, GdCo, GdFe, TbFe, DyFe or TbDyFe in lieu of GdTbFeCo, recording media were prepared and tested for corrosion resistance in the same manner. The results were nearly the same as in the case of GdTbFeCo.

EXAMPLE 3

Recording media having a GdTbFeCo recording layer were prepared in the same manner as in Example 2 but using 3000 Å thick protective layers of SiO in lieu of the 4000 Å thick titanium and using the rust preventives shown in Table 1. These recording media were tested for corrosion resistance under the same conditions as in Example 2. For each recording medium, the ratio of the coercive force after 500-hour exposure to the initial value is shown in Table 1.

TABLE 1

| Rust preventive | | Ratio of coercive force after 500 hours to the initial value |
|---|---|---|
| Name of agent | Amount used (wt. %) | |
| Zerust (Taiyo Ekikagasu Co.) | 3 | 0.86 |
| Diana (Ryoko Kagaku Co., Ltd.) | 3 | 0.80 |
| Cortop (Nippon Kakoshi Co., Ltd.) | 4 | 0.79 |
| Kiles Guard (Nippon Kagakusangyo Co., Ltd.) | 4 | 0.79 |
| Ferroguard (Ronco Laborotories Co., U.S.A.) | 4 | 0.81 |

TABLE 1-continued

| Rust preventive | | Ratio of coercive force after 500 hours to the initial value |
|---|---|---|
| Name of agent | Amount used (wt. %) | |
| Ruston N-20 (Tobi Kagaku Co., Ltd.) | 3 | 0.80 |
| Ruston U (Tobi Kagaku Co., Ltd.) | 3 | 0.78 |
| Ruston H-555 (Tobi Kagaku Co., Ltd.) | 3 | 0.82 |
| CRC-2-26 (Ryoko Kagaku Co., Ltd.) | 2 | 0.78 |
| Dialate #500 (Ryoko Kagaku Co., Ltd.) | 2 | 0.80 |
| CRC-3-36 (Ryoko Kagaku Co., Ltd.) | 2 | 0.82 |
| Not added | 0 | 0.75 |
| Metalguard 240 (Mobil Petroleum Co.) | 3 | 0.79 |
| V.P.M. (Nippon Kagakusangyo Co., Ltd.) | 4 | 0.80 |

This invention is not limited to these Examples, and various modifications thereof are possible. For example, a heat insulating layer or a reflection-preventing layer may be formed between the substrate and the recording layer.

What we claim is:

1. A recording medium which comprises a substrate, a recording layer formed on the substrate, an anticorrosive adhesive layer formed on the recording layer and containing a chemical agent capable of preventing corrosion of the recording layer and inert to the recording layer, and a protective plate bonded to the recording layer through the anticorrosive layer.

2. The recording medium of claim 1, wherein the recording layer comprises a thin magnetic film.

3. The recording medium of claim 2, wherein the thin magnetic film comprises an amorphous material selected from the group consisting of GdTbFeCo, GdTbFe, GdCo, GdFe, TbFe, DyFe and TbDyFe.

4. The recording medium of claim 1, wherein the chemical agent is a rust preventive agent.

5. The recording medium of claim 1, wherein the protective plate consists of glass.

6. The recording medium of claim 4, wherein the rust preventive is a volatile one.

7. The recording medium of claim 4, wherein the rust preventive is an oil-soluble one.

8. The recording medium of claim 4, wherein the quantity added of the rust preventive is up to 10% by weight based on the total weight of the anticorrosive layer.

9. The recording medium of claim 4, wherein the quantity added of the rust preventive is in the range of 2.0–5.0% by weight based on the total weight of the anticorrosive layer.

10. The recording medium of claim 4, wherein the thickness of the anticorrosive layer is in the range of 30–200 μm.

11. The recording medium of claim 1, wherein a protective layer is formed between the recording layer and the anticorrosive layer.

12. The recording medium of claim 11, wherein the protective layer comprises a metal.

13. The recording medium of claim 12, wherein the metal is selected from the group consisting of Ti, Cr, Zn, Al and Si.

14. The recording medium of claim 11, wherein the protective layer comprises an oxide.

15. The recording medium of claim 14, wherein the oxide is selected from the group consisting of SiO, $SiO_2$ and $Al_2O_3$.

16. The recording medium of claim 1, wherein the substrate is a glass plate.

17. A recording medium which comprises two substrates, a recording layer formed on each of the substrates, and an anticorrosive adhesive layer containing a chemical agent capable of preventing corrosion of the recording layer and inert to the recording layer, said anticorrosive layer bonding said two substrates such that the recording layers face each other.

18. The recording medium of claim 17 wherein the recording layer comprises a thin magnetic film.

19. The recording medium of claim 17 wherein the chemical agent is a rust preventive agent.

20. The recording medium layer of claim 17 wherein a protective layer is formed between the recording layer and the anticorrosive layer.

21. The recording medium of claim 17 wherein the substrate is a glass plate.

* * * * *